United States Patent [19]
Olsen

[11] 3,877,233
[45] Apr. 15, 1975

[54] FLOATING BREAKWATER SYSTEM
[75] Inventor: John O. Olsen, Lynnwood, Wash.
[73] Assignee: Reid, Middleton & Associates, Inc., Edmonds, Wash.
[22] Filed: Aug. 28, 1972
[21] Appl. No.: 284,453

[52] U.S. Cl. ..................................................... 61/5
[51] Int. Cl. ............................................. E02b 3/06
[58] Field of Search ............ 61/6, 5; 114/.5 F, .5 T, 114/.5 DB, 43.5, 66.5 F, 45; 9/8 R

[56] References Cited
UNITED STATES PATENTS

| | | | |
|---|---|---|---|
| 1,846,278 | 2/1932 | Roane | 61/5 |
| 2,977,608 | 4/1961 | Brown, Sr. et al. | 9/8 R |
| 3,179,076 | 4/1965 | Sheffield | 114/.5 F |
| 3,193,855 | 7/1965 | Chapman | 114/.5 F X |
| 3,276,210 | 10/1966 | Stitt | 61/5 |
| 3,426,537 | 2/1969 | Chenoweth et al. | 61/5 |
| 3,465,528 | 9/1969 | Usab | 61/5 |

Primary Examiner—Philip C. Kannan
Attorney, Agent, or Firm—Bernard A. Donahue

[57] ABSTRACT

A low cost floating breakwater system involving a large number of individual pontoon modules secured in an array by a network of structural members. The modules are shaped such that when nested together in the breakwater array they will provide a grid pattern having a plurality of regularly spaced openings in mutually transverse first and second directions, e.g., in both the lateral and longitudinal directions of the array; and a corresponding grid pattern of vertical walls extending into the upper portion of the wave to dissipate wave action by interference with the movement of fluid in the orbital flow under the wave crest.

13 Claims, 6 Drawing Figures

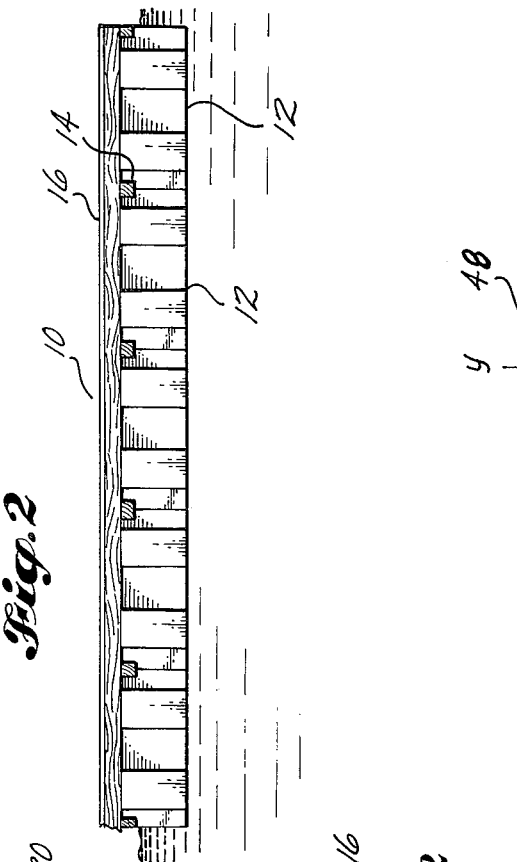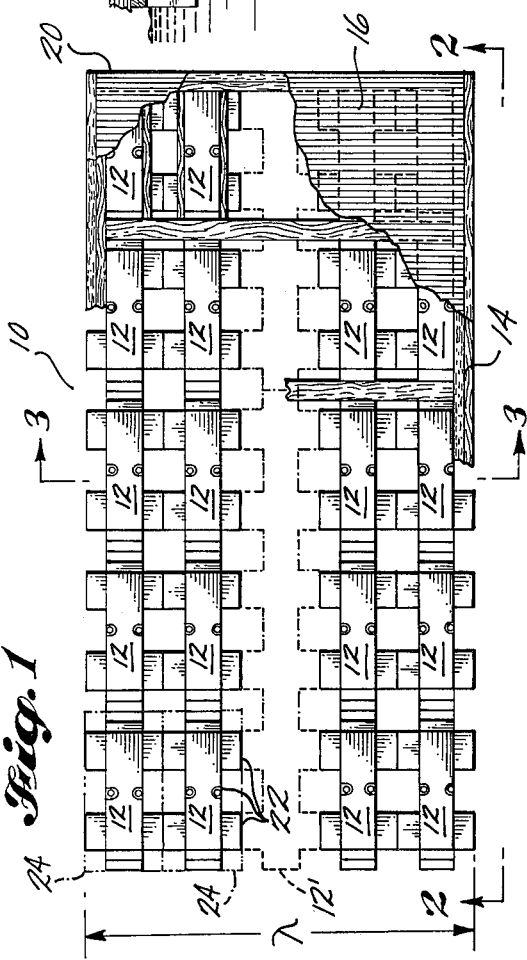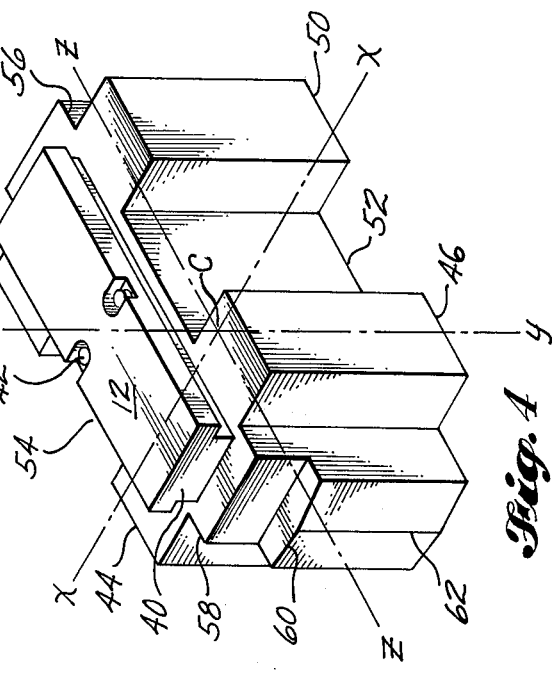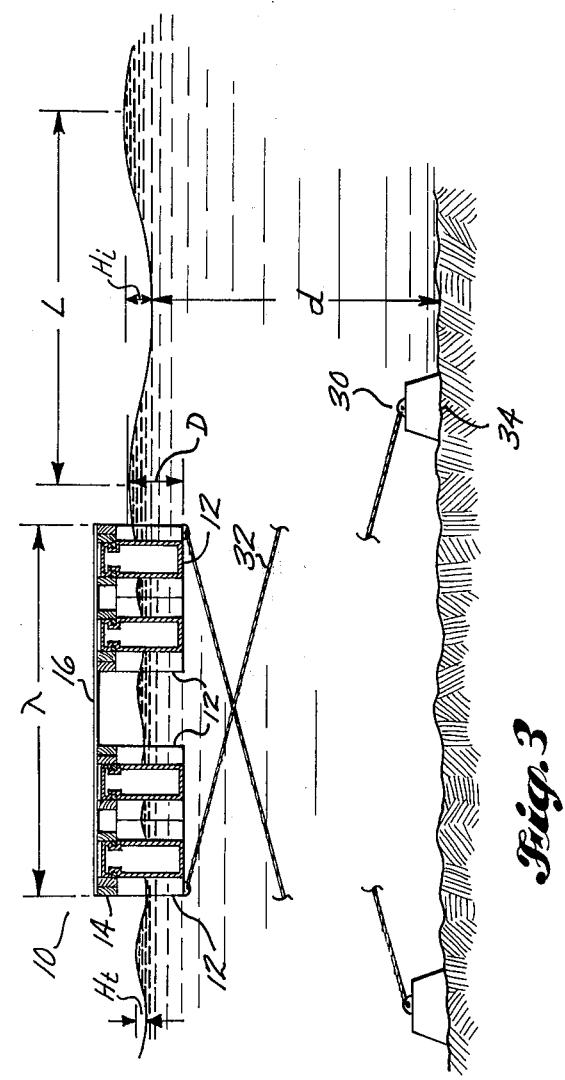

FLOATING BREAKWATER SYSTEM

BACKGROUND OF THE INVENTION

1. Field of the invention

This invention relates to suppression of wave action by a floating breakwater; and, more particularly, to a low cost floating breakwater concept involving a large number of individual pontoon modules collectively forming a grid pattern of walls and openings extending downwardly into the upper portion of the wave.

2. Discussion of the Prior Art

In order to protect the docking facilities of pleasure boat marinas, it is a common practice to construct a massive wall of rock and concrete extending from the shore to act as a barrier to dissipate destructive wave action. Such walls are undesirable in that they are unsightly, expensive to construct, and stagnate the water by preventing free circulation of water currents.

Various types of floating breakwater systems have been proposed for such marinas. However, most of these proposed systems have been considered unsatisfactory; either in terms of wave attenuation, installed cost, or long-term reliability. Typical prior art floating breakwater configurations include the following types: (1) arrays of concrete pontoons (U.S. Pat. No. 3,465,528 to Usab, and No. 3,376,209 to Mosdell); (2) fabric blankets (U.S. Pat. No. 3,188,813 to Foster et. al. and No. 3,218,809 to Rhodes et. al.); and (3) tire-like annular objects (U.S. Pat. No. 3,276,210 to Stitt and No. 3,357,192 to Hibarger).

Transportable or mobile floating breakwater systems which can be readily transported, quickly installed, and removed without undue difficulty are presently required for support of seacoast military and construction operations. However, currently available systems do not appear appropriate for these uses. See, for example, the 1971 report by the Naval Facilities Command, Port Hueneme, California entitled "Transportable Breakwaters — A Survey of Concepts — Technical Report R 727" which describes and reviews 106 proposed breakwater concepts while indicating that none seem to meet all of the desired requirements.

SUMMARY

The objectives of this invention are to provide a floating breakwater system which is: (1) relatively inexpensive to install; (2) inherently reliable; (3) superior in wave attenuation characteristics, and (4) readily transportable.

These and other objects are achieved in the preferred embodiment of the invention wherein a floating structure having a grid pattern of walls and openings is formed from a nested array of uniquely shaped molded plastic pontoon modules; the grid pattern having a plurality of regularly spaced openings in mutually transverse first and second directions, e.g. in both the lateral and longitudinal horizontal directions of the array, and providing corresponding vertical walls extending into the upper portion of the wave to interupt the horizontal orbital motion of the water under the wave crest and create turbulence to dissipate wave action. The securing means preferably include timber members which interfit within and secure the upper portions of the modules, and anchoring means for securing the array in position.

BRIEF DESCRIPTION OF THE DRAWINGS

FIG. 1 is a plan view of a portion of the floating breakwater of this invention.

FIG. 2 is a side elevation view taken at 2—2 in FIG. 1.

FIG. 3 is a cross-sectional view taken at 3—3 in FIG. 1, showing the anchoring system, and illustrating several performance parameters for the breakwater.

FIG. 4 is an isolated isometric view of one of the molded plastic pontoon modules of the FIG. 1 array.

DESCRIPTION OF THE PREFERRED EMBODIMENTS

Figure 6:
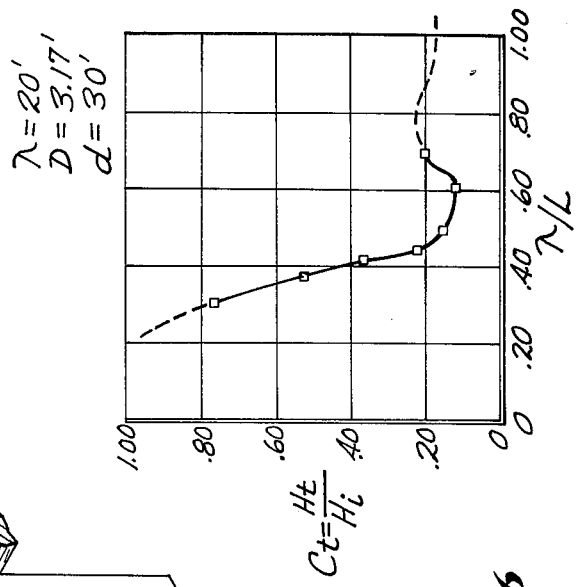
FIG. 6 is a plot of test results showing the coefficient of transmission, $C_t$, obtained with the breakwater concepts of this invention.

FIGS. 1 and 2 are plan and side elevation views of a portion of a longitudinally extending breakwater array 10, constructed of a large number of molded hollow plastic pontoon modules 12 nested together and secured by timber structural members 14. An upper wooden deck 16 is attached to members 14. The deck 16 serves to increase the lateral rigidity of the array 10, and provides a convenient walking surface. In a typical marina installation, each of the modules 12 will be of the order of five feet wide by ten feet in length, and five feet deep. The array 10 can be given any desired length, measured from the first end 20, merely by adding more modules 12. Typical breakwater lengths range from several hundred to several thousand feet, along one or more sides of a docking facility or harbor to be protected. Likewise, the array 10 can have any desired width, $\lambda$, depending upon the number of modules 12 joined in the array.

In the embodiment shown in FIGS. 1, 2 and 3, the modules 12 are aligned in a nested, or abutting pair of rows on each side of the breakwater. As shown in FIG. 1, the lateral protuberances of adjacent modules are located such that they are in a symmetrical abutting relationship, or are closely spaced with respect to each other so as to form a grid pattern of openings. A middle row of modules, shown in dotted lines at 12', may be inserted to obtain improved attenuation characteristics for certain of the shorter wave lengths, but this will, of course, increase the number of pontoons and the costs accordingly. As will be understood by persons skilled in this art, the breakwater width $\lambda$, the number, size, draft, and spacing of pontoons, is best determined for each installation, and will depend on the wave action to be dissipated. In general, an increase in the overall width $\lambda$, obtained by spacing apart nested pairs of rows, should increase the breakwater effectiveness for longer wave lengths with modest loss in short wave attenuation.

In the upper corner of FIG. 1, rectangular envelopes 24 have shown in phantom lines surrounding each of the two corner modules 12. These envelopes 24 are shown for purposes of discussion of the so-called "porosity" parameter which is used in the literature to describe one of the characteristics of breakwater configurations. Porosity is the ratio of the area of openings to the total area of the breakwater. The modules 12 preferably occupy approximately 70 percent of their rectangular planform envelopes 24. Accordingly, each module, and any closely nested sets of modules will have a porosity of the order of 30 percent. Modules having porosities ranging from approximately 15 to 40 percent or higher may be acceptable for some installations. With the middle row of modules 12' deleted as indicated in FIG. 1, the porosity of the entire array 10 will be increased, to approximately 44 percent. Most installations will have an overall porosity range from 30 to 60 percent when using the modular nested pontoon concepts of this invention.

FIG. 3 is a cross-sectional view through the breakwater array 10, taken at 3—3 in FIG. 1. FIG. 3 also schematically shows an anchoring system 30, provided at selected longitudinal positions along the length of the breakwater to react the structural loads caused by the wave action. The anchor system 30 is connected to the timber members 14. Anchor ropes 32 preferably have a slope of about one unit vertical to four horizontal and are secured to anchoring members 34 imbedded in the floor of the channel.

FIG. 3 also serves to illustrate many of the functional parameters of the breakwater concept. The wavelength of the approaching, or incident, wave is shown as L; the height of the incident wave is $H_i$; the height of the transmitted wave is $H_t$; the depth of the channel is d; the width of the breakwater is $\lambda$; and the draft of the breakwater is designated D. The parameter $\lambda/L$ is commonly used in breakwater efficiency comparisons. L/d is the usual parameter for defining the type of horizontal or orbital fluid velocity field encountered at various depths of water in the channel. For L/d ratios of the order of 2.0 much of the kinetic energy of the wave is near the surface; the horizontal velocity at mid-depth of the channel being only approximately 20 percent of the surface velocity. Accordingly, a floating breakwater having a short draft (D) compared with the channel depth (d), can be effective if properly designed because it is exposed to, and acts upon, a sizeable portion of the total wave energy. In the breakwater system of this invention, a relatively low porosity (30% to 60%) grid pattern of vertical walls and openings is presented to the upper portion of the wave. Circulating fluid in the orbital flow under the crest of the wave is interrupted and forced into the openings to create turbulence and dissipate wave energy.

Breakwater effectiveness is often measured by the coefficient of transmission $C_t$, which is the ratio of the transmitted to the incident wave heights ($H_t / H_i$); and this parameter $C_t$ is normally plotted against $\lambda/L$, as shown in FIG. 6. As will be more fully discussed in connection with FIG. 6, model testing has shown excellent results in terms of $C_t$ for the breakwater system of this invention. Additionally, because of the rectangular grid pattern of many vertical walls and openings, the breakwater possesses excellent directional characteristics. That is, the breakwater will dissipate wave action coming from any of several directions; such as will occur when the wind direction is changing.

FIG. 4 is an isolated isometric view of one of the individual pontoon modules 12 of FIG. 1. For convenience in description, longitudinal axis Z—Z, vertical axis Y—Y, and lateral axis X—X are shown passing through the overall centroid C of the module 12, thereby defining three mutually perpendicular reference planes; two of which, the Y—Z and Y—X, are planes of symmetry for the pontoon module 12. The module 12 is preferably a hollow integrally molded plastic article, having an essentially uniform wall thickness of the order of one-half inch. As noted previously, in one embodiment each module 12 will be approximately 5 feet wide (along X-axis) by 10 feet in length (along Z-axis), and 5 foot deep (along Y-axis). This means the wall thickness will be less that 2 percent, and preferably approximately 1 percent, of the depth of the module. To obtain the required degree of strength, durability, and fatique life in a plastic article of this configuration, it is preferred that it be sinter molded from a powdered polyolefin material; preferably using rotary molding equipment of the type described in U.S. Pat. No. 3,450,395 entitled "Rocking Furnace for Sinter Molding Plastic Objects", by Lars Ringdal, which produces stress-free and durable large hollow objects with an optimum utilization of furnace space and heat energy. As is well known to persons skilled in the sinter molding art, a proper selection of the powdered material, sinter times, motions, and heating and cooling temperatures are all of critical importance in obtaining a high quality molded article in objects of this size.

The module 12 of FIG. 4 has a T-shaped upper portion 40 serving as a securing means, and a pair of ballast openings covered by removable threaded filler caps 42. Protuberant side sections 44, 46 and 48, 50 extend symmetrically outwardly on opposite sides of longitudinal Plane Y—Z, with flat end surfaces substantially parallel to the Y—Z plane for nesting close to or against other similar surfaces of adjacent modules in the breakwater array 10. Between protuberant sections 46 and 50 on the near side of module 12 there is a recess with an inner wall 52. Similarly, between protuberant sections 44 and 48 on the far side, there is a recess having an inner wall 54. At each longitudinal end along the Z-axis, protuberant end sections 56 and 58 are formed with side walls essentially coplanar with inner walls 52 and 54, and a notch 60 which serves as a second securing means for nesting the timbers in the array 10, as will be more apparent in FIG. 5. Thus it can be seen that each module 12 is provided with an upper portion 40 serving as a securing means; a generally rectangular longitudinally elongated central portion having side walls 52, 54 and a pair of oppositely disposed protuberant end sections 56 and 58 at each longitudinal end; a pair of protuberant side sections 44, 46 extending laterally outwardly from said central portion a perpendicular distance of the order of 50 percent of the width of said central portion; and a similar pair of protuberant side sections 48, 50 spaced from 44, 46 so as to form recesses extending to the inner walls 52 and 54. It should be apparent then, that when a number of modules 12 are nested together in an array as in FIG. 1, they will collectively form a grid pattern of walls and openings extending into the upper portion of the wave front, as shown in FIG. 1.

It will be noted that the draft, D, shown in FIG. 3, can be closely controlled by the addition of ballast material, such as water, through the filler caps 42. For increased strength, a plastic foam product, such a polyurethane or polystyene foam, may be blown into and permanently installed within the module. Concrete could be used as a bottom layer of ballast material with the foam and/or water ballast for the upper portions of the interior.

Figure 5:
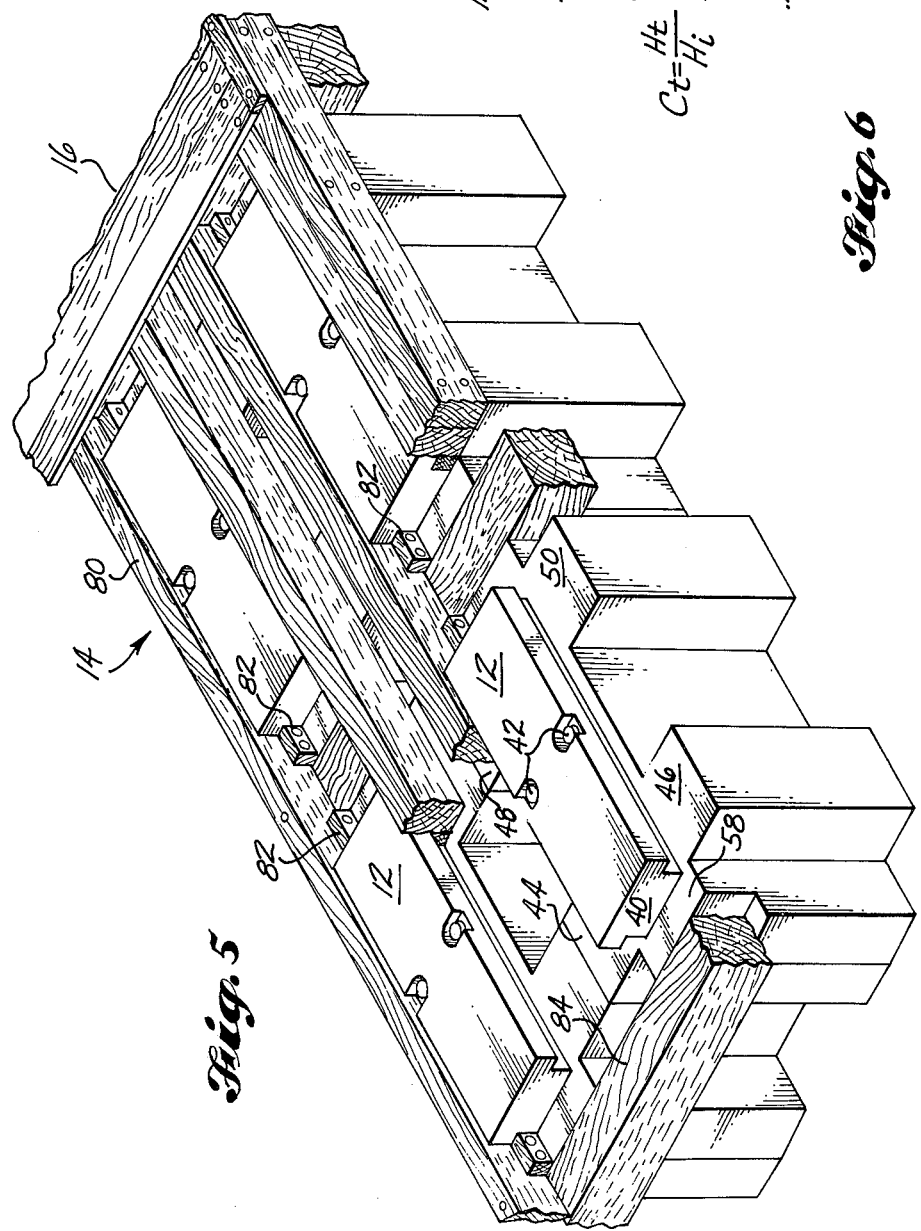
FIG. 5 is an isometric view of a portion of the FIG. 1 array; with cut-away sections to show the interfitting of the pontoons with the timber structure.

FIG. 5 is an isometric view of a portion of the FIG. 1 array, with cutaway sections to show the interfitting of the modules 12 with the timber securing structure 14. Longitudinal timbers 80 are provided with securing members 82 which interfit and nest within the T-shaped securing means of the upper portion 40 of the modules 12. Lateral timbers 84 interfit with the notches 60 of the protuberant end portions 56 and 58. In this manner the modules 12 are secured in the array 10 to form a grid pattern of alternate walls and openings extending into the wave front. As noted previously, the porosity of the grid pattern formed by the nested modules is preferably approximately 30 percent, but the porosity of the entire array can range upwardly as high as 60 percent while retaining effective wave attenuation; particularly if the overall width $\lambda$, is increased accordingly, as by deleting a middle row of modules 12.

FIG. 6 shows the coefficient of transmission, $C_t = H_t/H_i$, plotted against $\lambda/L$, for a one-tenth scale test model of a simulated breakwater configuration of the type shown in FIG. 1. The model tested was integrally molded of polyethelene plastic to have smooth sides, rather than the irregular side surfaces of the modules 12 of FIG. 1, and the porosity was a uniform 30 percent. The testing was performed in a rectangular wave channel 164 feet long and 4.0 feet wide, with a water depth of 3.0 feet. The wave generator was of the hinged flap variety. The tests were run at the same stroke magnitude but at a discrete number of frequencies. Each incident wave was measured with the breakwater model out of the channel. The breakwater was then inserted in the channel, and after allowing the water to come to rest, the wave generator was started again using the same generator setting. The amplitudes of the incident and transmitted waves, respectively were read from an oscillograph record for the two separate times of wave generation. As noted in FIG. 6, the test simulated a full scale breakwater width $\lambda$ of 20 feet, a draft $D$ of 3.17 feet, and a channel depth $d$ of 30 feet. The test results illustrate the effectiveness of the grid pattern of walls and openings of the breakwater of this invention in interupting the orbital motion of the wave action while extending into the water only approximately ten percent of the depth of the channel. It will be noted that these results indicate an attenuation of the order of 20 percent ($C_t = 0.20$) for wave lengths up to 45 feet ($\lambda/L = 0.44$) using a breakwater width, $\lambda$, of only 20 feet.

While a preferred embodiment of the present invention has been depicted and described, it will be apparent that many variations and modifications may be made thereto without departing from the spirit and scope of the invention. For example, the grid pattern of walls and openings shown may be achieved with other shapes of nested plastic modules such as modules with protuberant side sections on one side only and large modules with interior openings; or with nested modules of other materials, shaped, disposed and secured in a somewhat different manner. It will also be apparent that while the pontoons described herein have been shown to be ideally suited for suppression of wave action, the pontoons obviously have general utility as floatation pontoons for docks and other floating structures. Many variations of the disclosed concepts will be apparent to those skilled in the art. Accordingly, it is intended in the appended claims to cover all such variations and modifications.

What is claimed to be secured and desired by U.S. letters patent is:

1. A floating breakwater array to dissipate wave action in a body of water comprising a plurality of individual similarly shaped pontoon modules secured and held in the array by a network of structural members to collectively form a grid pattern of vertical walls and openings; said grid pattern having a plurality of regularly spaced openings in mutually transverse first and second horizontal directions of the array, and anchoring means connected to said array to secure it in a desired position in said body of water wherein said vertical walls and openings extend into the upper portion of the wave to interfere with the movement of fluid in the orbital flow under the wave crest; wherein said pontoon modules each comprise vertical walls which form a generally rectangular central portion having oppositely disposed protuberant end sections; said vertical walls also forming at least one protuberant side section which is located between said protuberant end sections and which extends laterally outwardly away from said central portion.

2. A floating breakwater array to dissipate wave action in a body of water comprising a plurality of individual similarly shaped pontoon modules secured and held in the array by a network of structural members to collectively form a grid pattern of vertical walls and openings: said grid pattern providing a plurality of regularly spaced openings of substantially uniform size in each of two mutually transverse first and second horizontal directions of the array; said grid pattern having a porosity ratio of openings to total area of the array ranging from approximately 30 to 60 percent and anchoring means connected to said array to secure it in a desired position in said body of water wherein said vertical walls and openings extend into the upper protion of the wave to interfere with the movement of fluid in the orbital flow under the wave crest.

3. A floating breakwater array to dissipate wave action in a body of water comprising a plurality of individual similarly shaped pontoon modules secured and held in the array by a network of structural members to collectively form a grid pattern of vertical walls and openings; said grid pattern having a plurality of regularly spaced openings in mutually transverse first and second horizontal directions of the array; and anchoring means connected to said array to secure it in a desired position in said body of water wherein said vertical walls and openings extend into the upper portion of the wave to interfere with the movement of fluid in the orbital flow under the wave crest; wherein said modules are secured in said array by structural members which interfit within a generally T-shaped upper portion of each of said modules, and wherein said regularly spaced openings are substantially rectangular and are of uniform size.

4. The breakwater array of claim 3 wherein said protuberant side section extends laterally outwardly from said central portion by an amount which is of the order of 50 percent of the width of said central portion.

5. The floating breakwater array of claim 3 wherein said grid patterns has a plurality of regularly spaced rectangular openings of substantially uniform size in each of two mutually perpendicular horizontal directions of said array.

6. The floating breakwater array of claim 3 wherein said plurality of individual similarly shaped pontoon modules comprises modules shaped to provide vertical walls departing from a rectangular space envelope defined by its outer surfaces in the horizontal plane, such that the module has a porosity ratio of area of openings and recesses to the total area of the rectangular space envelope of the order of 30 percent.

7. The floating breakwater array of claim 3 wherein said grid pattern has a porosity area ratio of openings to total area of the array ranging from approximately 30 to 60 percent.

8. The breakwater array of claim 3 wherein said modules are arranged and secured to form a first set of at least two longitudinally extending rows of modules abutted together laterally and forming between them a pattern of plurality of generally rectangular openings having vertical walls extending into the upper portion of the wavefront; the porosity ratio of the total horizontal area of open spaces to the total horizontal area envelope defined by the location of the outer surfaces of said rows being approximately 30 percent.

9. The breakwater array of claim 8 wherein there is provided a second set of at least two longitudinally extending rows of individual modules abutted together laterally; said second set of rows of modules being spaced apart a selected distance from said first set; the combined overall porosity ratio of said first and second sets of modules being increased from said 30 percent in accordance with the selected distance at which said sets of rows are spaced apart.

10. The breakwater array of claim 3 wherein said vertical walls of said modules form a pair of oppositely disposed protuberant side sections which extend laterally outwardly away from said central portion.

11. The breakwater array claim 4 wherein said protuberant side sections extends laterally outwardly from said central portion by an amount which is of the order of 50 percent of the width of said central portion.

12. The breakwater array of claim 10 wherein said pontoon modules have at least two pairs of oppositely disposed protuberant side sections extending laterally outwardly away from said central portion to thereby form between them at least one centrally located recess on each side of said module; said recess having an inner wall which forms one side of one of said openings in said grid pattern of vertical walls and openings when said module is abutted at its side sections against another similarly shaped module in the breakwater array.

13. The breakwater array of claim 12 wherein vertical walls of said protuberant end sections and said protuberant side sections cooperate to form regularly spaced openings when said modules are abutted together in said array.

* * * * *